United States Patent [19]
Ohno et al.

[11] Patent Number: 5,378,031
[45] Date of Patent: Jan. 3, 1995

[54] BUMPER MOUNTING CONSTRUCTION

[75] Inventors: Moriyuki Ohno; Yasuhisa Nakada, both of Hamamatsu, Japan

[73] Assignee: Suzuki Motor Corporation, Hamamatsu, Japan

[21] Appl. No.: 124,294

[22] Filed: Sep. 20, 1993

[30] Foreign Application Priority Data

Oct. 13, 1992 [JP] Japan .................. 4-274043

[51] Int. Cl.⁶ .............................................. B60R 19/24
[52] U.S. Cl. ...................................... 293/102; 293/155
[58] Field of Search ................. 293/1, 102, 120, 154, 293/155

[56] References Cited

U.S. PATENT DOCUMENTS

| | | | |
|---|---|---|---|
| 1,372,157 | 3/1921 | McGregor | 293/155 |
| 4,142,753 | 3/1979 | Klie et al. | 293/102 |
| 4,563,028 | 1/1986 | Ogawa et al. | 293/155 X |
| 4,929,008 | 5/1990 | Esfandiary | 293/120 X |

FOREIGN PATENT DOCUMENTS

| | | | |
|---|---|---|---|
| 214442 | 12/1983 | Japan | 293/102 |
| 112742 | 5/1991 | Japan | 293/102 |

*Primary Examiner*—Dean J. Kramer
*Attorney, Agent, or Firm*—Arnold, White & Durkee

[57] ABSTRACT

With the bumper mounting construction in accordance with the present invention, a bumper bracket 10 is disposed on the bottom plate 4b of a side member 4 to form a space 11 expanding toward the front in the front end portion 4a of the side member. On the other hand, a step portion 12 for positioning is disposed at the upper part of the end portion 2b of a bumper stay, and a stopper 13 is protruded at the deep portion of the space 11 corresponding to the step portion for positioning. Thus, when a bumper 1 is installed, the bumper stay 2 is positioned relative to the side member 4 and fixed temporarily thereto by engaging the step portion 12 for positioning with the stopper 13 while the bumper stay 2 is inserted in the space 11 along the bumper bracket 10.

3 Claims, 4 Drawing Sheets

5,378,031

BUMPER MOUNTING CONSTRUCTION

FIELD OF THE INVENTION AND RELATED ART STATEMENT

The present invention relates to a bumper mounting construction and, more particularly to a bumper mounting construction in which a bumper stay protruding from a bumper beam is inserted into the front end portion of a side member and fixed thereto.

A bumper mounting construction as shown in FIG. 6 has so far been used. With this mounting construction, a bumper 1 has a bumper beam 3 having a bumper stay 2 which protrudes toward the rear of the vehicle.

The bumper 1 is so constructed that the bumper stay 2 is inserted into the front end portion a of a side member 4, and then fixed to the side member 4 using bolts 5.

Nuts 6 are welded beforehand to the bottom plate 2a of the bumper stay 2 for fastening the bolts 5.

In the above-described bumper mounting construction, the center of gravity of the bumper 1 shifts from the bumper stay 2 to the bumper facing 7 side. Therefore, the bumper 1 turns as indicated by the imaginary line in the figure when the bumper 1 is installed. For this reason, the installation work cannot be done smoothly unless the bumper 1 is supported to prevent it from turning.

Therefore, a bumper mounting construction as shown in FIG. 7 has been proposed.

With this bumper mounting construction, a tongue member 8 is formed on the bottom plate 2a of the bumper stay 2, and a hole 9 is formed on the bottom plate 4b of the front end portion 4a of the side member 4 to accommodate the tongue member 8, so that the bumper 1 is temporarily fixed and stabilized by engaging the tongue member 8 with the hole 9 upon installation of the bumper 1 in order to smoothly perform the installation work of bumper 1.

With the above bumper mounting construction, however, the tongue member 8 is inserted in the hole 9 at a place invisible from the outside, so that time is required for the insertion of the tongue member 8, thereby the mounting workability of the bumper 1 being lowered.

Also, when the tongue member 8 is inserted in the hole 9, the tongue member 8 rubs the bottom plate 4b of the side member 4, so that the paint coating on the bottom plate 4b is removed; as a result, rusting forms.

OBJECT AND SUMMARY OF THE INVENTION

The present invention was made to solve these problems. Accordingly, an object of the present invention is to provide a bumper mounting construction which improves the bumper mounting workability and prevents the formation of rusting at the front end portion of the side member.

According to the present invention, to achieve the above object, a bumper bracket is disposed on the bottom plate of a side member to form a space expanding toward the front in the front end portion of the side member. On the other hand, a step portion for positioning is disposed at the upper part of the end portion of a bumper stay, and a stopper is protruded at the deep portion of the space corresponding to the step portion for positioning. Thus, when a bumper is installed, the step portion for positioning is engaged with the stopper while the bumper stay is inserted in the space along the bumper bracket.

DETAILED DESCRIPTION OF PREFERRED EMBODIMENTS

One embodiment of a bumper mounting construction in accordance with the present invention will be described below with reference to the attached drawings.

Figure 6:
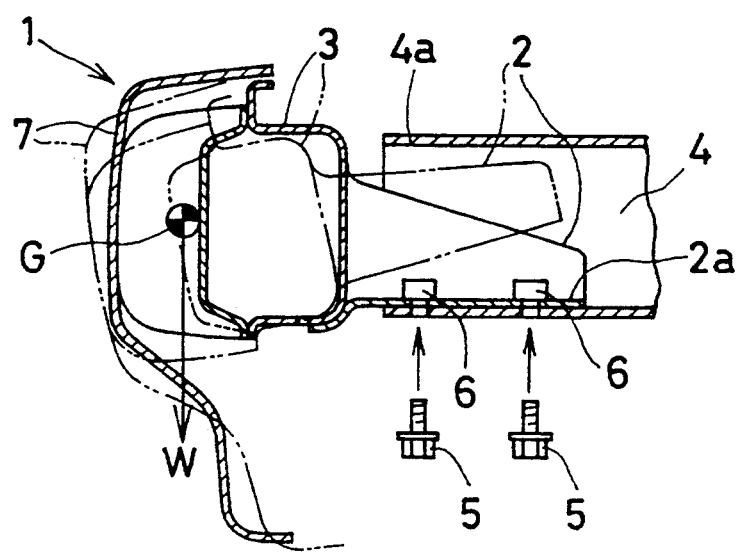
FIG. 6 is a longitudinal sectional view of a conventional bumper mounting construction.
Figure 7:
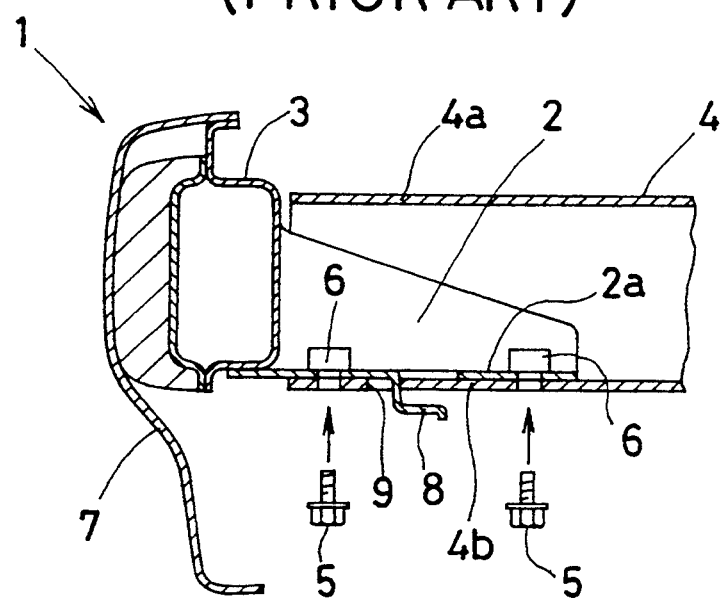
FIG. 7 is a longitudinal sectional view of another conventional bumper mounting construction.

FIGS. 1 through 5 show one embodiment of the present invention. For convenience in explanation, in FIGS. 1 through 5, like reference characters are applied to the elements having the same function as those shown in FIGS. 6 and 7, and the detailed explanation of the elements is omitted.

With the bumper mounting construction of this embodiment, a bumper bracket 10 is disposed on the bottom plate 4b of a side member 4 to form a space 11 which expands toward the front in the front end portion 4a of the side member.

Also, a step portion 12 for positioning is disposed at the upper part of the end portion 2b of the bumper stay 2, and a stopper 13 is protruded at the deep portion in the space 11 corresponding to the step portion for positioning.

Figure 1:
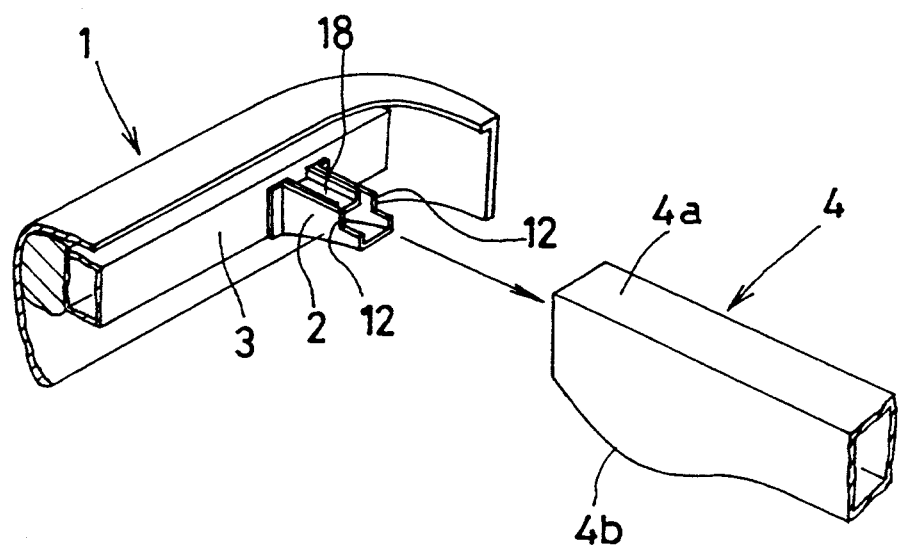
FIG. 1 is an exploded perspective view of one embodiment of a bumper mounting construction in accordance with the present invention.
Figure 2:
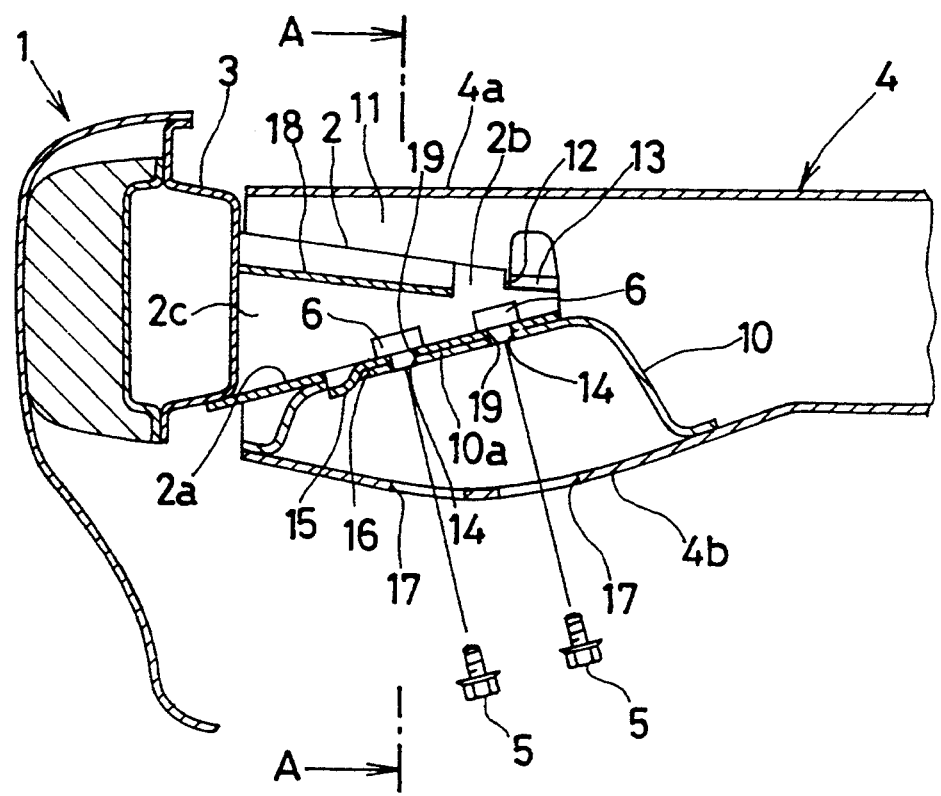
FIG. 2 is a longitudinal sectional view of one embodiment of a bumper mounting construction in accordance with the present invention.
Figure 3:
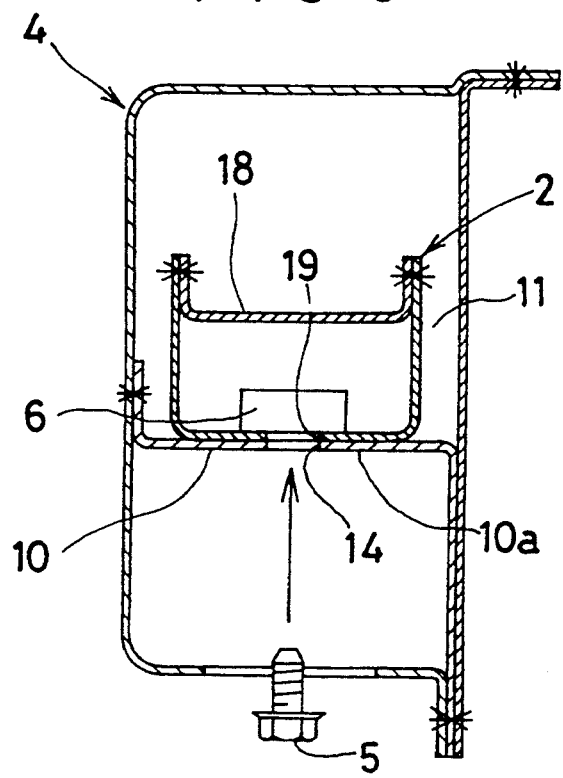
FIG. 3 is a sectional view taken along the line A—A of FIG. 2.

The bumper bracket 10 has an inclined portion 10a so that the space 11 expands toward the front as shown in FIGS. 2 and 3. The bumper bracket 10 is curved and the front and rear ends thereof are fixed to the bottom plate 4b of the side member 4.

Figure 4:
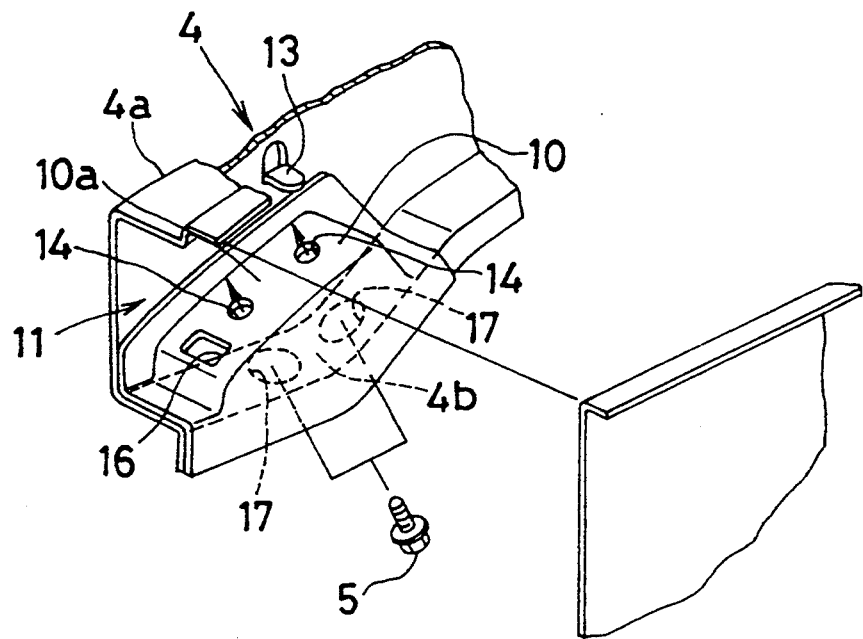
FIG. 4 is an exploded perspective view of the front end of a side member of one embodiment of a bumper mounting construction in accordance with the present invention.
Figure 5:
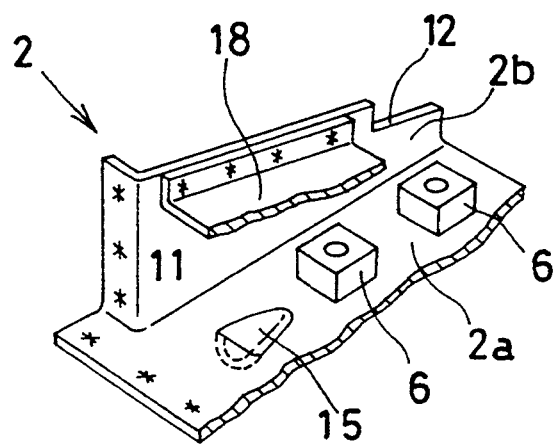
FIG. 5 is a partially cutaway perspective view of a bumper stay of one embodiment of a bumper mounting construction in accordance with the present invention.

In the inclined portion 10a of the bumper bracket 10, a plurality of bolt insertion holes 14 and a hole 16 with which a tongue member 15 of the bumper stay, which is described later, is engaged are formed as shown in FIGS. 2 and 4.

Corresponding to the bolt insertion holes 14 formed in the bumper bracket, a plurality of insertion holes 17 with a slightly larger diameter are formed in the bottom plate of the front end portion 4a of the side member 4.

The front end portion 4a of the bottom plate 4b of the side member is curved downward so that the insertion holes 17 are at the lowest position.

The bumper stay 2 is tapered from its base 2c toward its end portion 2b so that its longitudinal cross section is triangular, as shown in FIGS. 2 and 3.

Also, the bumper stay 2 is provided with a brace 18 at the upper portion thereof except the end portion 2b, so that a closed cross section is formed.

On the bottom plate 2a near the base 2c of the bumper stay 2, a tongue member 15 protrudes downward. This tongue member 15 is formed by cutting a part of the bottom plate 2a and pushing out so that the tongue member 15 protrudes downward toward the base 2c of the bumper stay 2.

In the bottom plate 2a of the bumper stay 2, a plurality of insertion holes 19 are formed corresponding to the bolt insertion holes 14 formed in the bumper bracket 10, and a nut 6 is welded above each insertion hole 19.

Next, the operation of this embodiment will be described.

In this embodiment, the bumper stay 2 is first inserted in the space 11 in the front end portion 4a of the side member 4.

At this time, the bumper stay 2 is smoothly guided into the space 11 since the space 11 is formed so as to be narrower toward the deep portion. At a predetermined position, the step portion 12 for positioning of the bumper stay 2 is engaged with the stopper 13, and the tongue member 15 of the bumper stay 2 is inserted in the hole 16 in the bumper bracket 10.

Therefore, the bumper is positioned and temporarily fixed by the engagement of the step portion 12 for positioning with the stopper 13, and the temporary fixing to the side member 4 is reliably performed particularly by the insertion of the tongue member 15 in the hole 16.

When the bumper stay 2 is inserted in the space of the side member 4, the bumper stay 2 is smoothly guided along the inclined portion 10a of the bumper bracket 10 since the bumper stay is tapered in addition to the fact that the space 11 is formed so as to be narrower toward the deep portion.

Therefore, the bumper stay 2 is smoothly inserted without damaging the bottom plate 4a of the side member 4 in the space 11.

Since the space is formed so as to be narrower toward the deep portion and the bumper stay 2 is tapered, the bumper 1 does not turn by its weight when the bumper stay 2 is inserted in the space 11 of the side member 4 to install the bumper 1.

Thus, the positioning and temporary fixing of the bumper 1 are performed without damaging the bottom plate 4a of the side member 4 by merely inserting the bumper stay 2 in the front end portion 4a of the side member 4.

Then, the bumper 1 is fixed to the side member 4 by fastening bolts 5 to the nuts 6 of the bumper stay 2 through the holes 14 in the bumper bracket 10.

If the bolt 5 is not fastened successfully, the bolt 5 is automatically discharged through the hole 17 in the side member 4 because the bottom plate 4b of the side member 4 is curved, thereby the work efficiency being improved further.

With the bumper mounting construction in accordance with the present invention, the bumper bracket is disposed on the bottom plate of the side member to form the space expanding toward the front in the front end portion of the side member. On the other hand, the bumper stay is provided with the step portion for positioning at the upper part of the end portion thereof, and a stopper is protruded at the deep portion of the space corresponding to the step portion for positioning, by which the bumper can be easily fixed temporarily at a predetermined position by merely inserting the bumper stay in the front end portion of the side member because the bumper stay is so constituted that the step portion for positioning of the bumper stay is engaged with the stopper while the bumper stay is inserted in the space along the bumper bracket to install the bumper.

Moreover, the bumper does not turn at this time, so that it is unnecessary for the operator to support the bumper body during the bolt fastening work for fixing the bumper stay to the side member. Therefore, the workability of bumper mounting work can be improved.

Since the bumper stay is tapered in addition to the fact that the space is formed so as to be narrower toward the deep portion, the bumper stay is smoothly guided along the inclined portion of the bumper bracket when the bumper stay is inserted in the space of the side member.

Therefore, the bumper stay is smoothly inserted in the space of the side member without damaging the bottom plate of the side member, thereby the formation of rusting being prevented.

Further, according to the present invention, since the bumper can be fixed temporarily, the assembly work can be divided into two processes: a setting process in which the bumper is set to the side member, and a fastening process in which the bumper is fixed to the side member. Therefore, the freedom of work assignment can be increased.

Also, according to the present invention, since the bumper can be fixed temporarily to a predetermined position by merely inserting the bumper stay in the front end portion of the side member, the requirement for automatic assembly can be easily met.

We claim:

1. A bumper mounting construction wherein a bumper stay protruding from a bumper beam is inserted on a side member to fix a bumper, comprising:
   a bumper bracket disposed on said side member to form a space expanding toward the front in the front end portion of said side member, and defining an inclined portion
   a step portion for positioning disposed at the upper part of the end portion of said burner stay, and a stopper situated in said space,
   said step portion for positioning of said bumper stay is engaged with said stopper while said bumper stay is inserted in said space along said bumper bracket when a bumper is installed, and
   wherein bolt insertion holes are formed in the inclined portion of said bumper bracket, insertion holes are formed in said bumper stay corresponding to said bolt insertion holes, nuts are installed above the insertion holes in said bumper stay, the bottom plate of the front end portion of said side member is curved, and insertion holes are formed near the lowest position of said bottom plate, by which, when a bolt is not fastened successfully to the nut of the bumper stay through the bolt insertion hole in said bumper bracket, said bolt is automatically discharged to the outside through the insertion hole in the bottom plate at the front end portion of said side member.

2. A bumper mounting construction wherein a bumper stay extends from a bumper beam in the rearward direction of a vehicle and is inserted in a front end portion of a side member, comprising:
   a bumper bracket disposed in said side member and provided with an inclined portion for forming a spacing to expand in the forward direction of the vehicle;

said bumper stay provided with a bottom plate and an upper part, said bottom plate inclined relative to its top edge;

a bumper-stay positioning step portion provided on said upper part;

a stopper situated in the spacing to engage said bumper-stay positioning step portion when said bumper stay is inserted in said spacing;

a tongue member formed in said bottom plate of said bumper stay; and a hole formed in said inclined portion of said bumper bracket, said hole positioned to enable said tongue member of said bumper stay to engage said hole when said bumper-stay positioning step portion engages said stopper.

3. A bumper mounting construction according to claim 2 wherein a tongue member is protruded from the bottom plate of said bumper stay, and a hole is formed in the inclined portion of said bumper bracket, by which, when said bumper stay is inserted in the space in said side member, said tongue member of said bumper stay is inserted in said hole in said bumper bracket, so that said bumper stay is temporarily fixed to said side member.

* * * * *